United States Patent Office 3,347,555
Patented Oct. 17, 1967

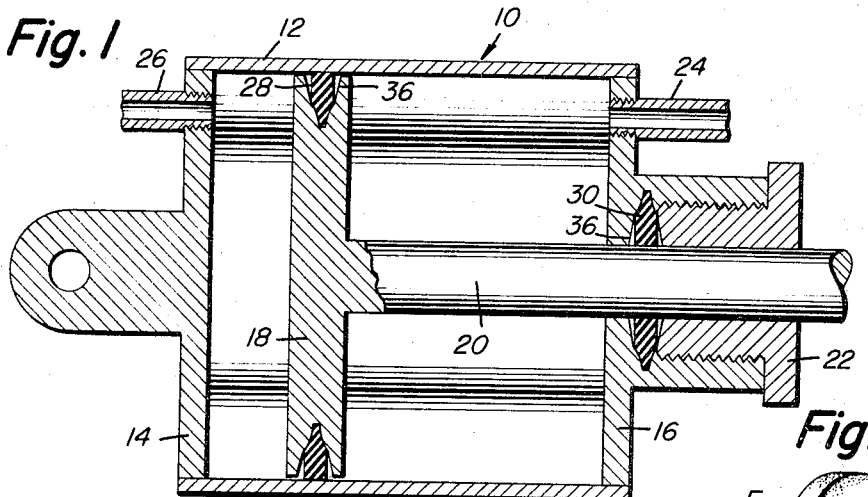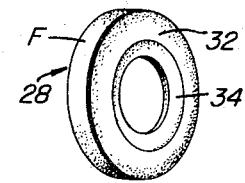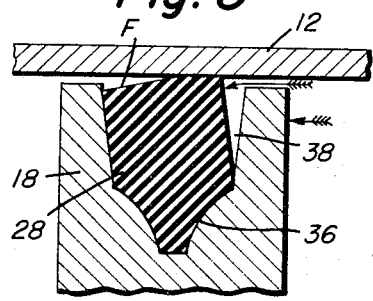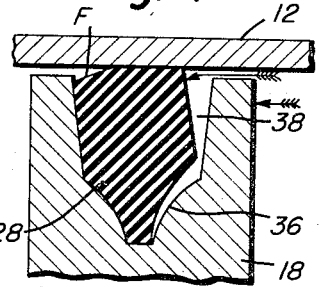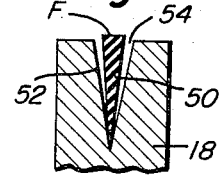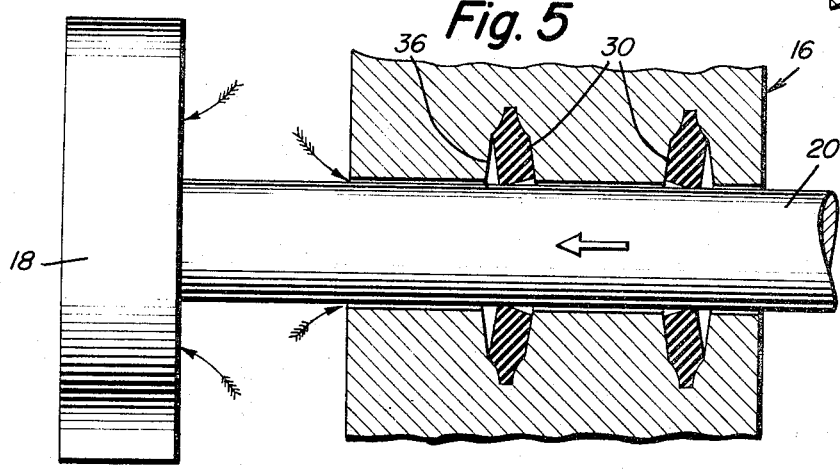

3,347,555
SEAL RINGS FOR PRESSURE CYLINDERS
Orlo C. Norton, 544 Virginia Ave., Erie, Pa. 16505
Filed Aug. 11, 1964, Ser. No. 388,778
3 Claims. (Cl. 277—171)

This invention relates generally to pressure responsive cylinders, and more particularly it pertains to improved packing and sealing rings for the sliding parts of fluid motor cylinders.

The reciprocating pistons and rods of fluid-pressure-operated cylinders have in the past been sealed against fluid leakage by seated rings of square, circular, U-shaped or L-shaped cross-section. Attention has also been given to provide increased contact pressure between the ring and sliding part to further reduce leakage by introducing the pressure fluid into cavities as in the case of the U and L shapes mentioned above and by means of inner springs and the like.

All such expedients have tended toward shortened life of the ring, the cylinder wall, and the rod, requiring frequent replacement, reboring, or re-turning of the component part.

Another cause of rapid wear of the cylinder is the wiping clear of lubricant from the sliding wall with each stroke.

In the light of the foregoing, it is an object of this invention to provide a novel seal ring arrangement for pressure-operated-cylinders which operates without excessive wall pressure for improved operating life, and, at the same time, provides a good seal.

Another object of this invention is to provide a pressure operated ring seal which is more conforming and tolerant of fit.

Still another object of the invention is to provide a seal ring for pressure motors which is simple in construction, highly efficient in use, and which has an extended life and can be produced at low cost.

Other objects and attendant advantages of this invention will become more readily apparent and understood from the following detailed specification and accompanying drawings in which:

FIG. 1 is a longitudinal cross-sectional view of a cylinder and piston incorporating features of this invention;

FIG. 2 is a perspective of the piston ring on a reduced scale;

FIG. 3 is a greatly enlarged fragmentary cross-sectional view of the piston ring in the piston showing the action of pressure fluids;

FIG. 4 is a view similar to FIG. 3 showing the result of wear;

FIG. 5 is an enlarged cross-sectional depiction of the piston rod packing showing two applications of the novel sealing ring; and FIG. 6 is a fragmentary cross-section of the piston showing another embodiment of the invention.

Referring now to the details of the drawings, as shown in FIG. 1 reference numeral 10 indicates generally a fluid pressure operated actuator cylinder or motor. This motor 10 consists of a cylinder 12 fitted with a cylinder head 14 and a rod end cover 16.

A piston 18 is attached to a piston rod 20, and the latter is arranged to reciprocate within this cylinder 10. The rod 20 extends to the exterior through a gland nut 22 on the rod end cover 16. From rod 20, useful mechanical energy can be derived by suitable connections thereto, not shown, when pressure fluid is introduced through conduit 24 or 26 to move the piston 18.

The piston ring 28 as best shown in FIG. 2 consists of an elastic annular ring of nylon, Teflon, and other types of elastic materials, such as natural and synthetic rubbers, commonly called elastomers having a rectangular cross-section portion 32 adjacent to its flat peripheral working face F and a tapering lip or thinned portion 34 adjacent to the opposite periphery.

This ring 28 is seated in a groove 36 which generally conforms to the thinned portion 34 but which tapers outwardly away from the rectangular portion 32 at about ten degrees greater angle on each side. Thus, the ring 28 is snugly retained in the bottom of this groove 36 but can bend to one side or the other within the plus or minus ten degrees of freedom.

One side of this region of freedom or space 38 is accessible to the pressure fluid as shown by the feathered arrows in FIG. 3 as leakage between the cylinder wall and piston. The piston ring 28 is dimensioned to contact the cylinder wall with only moderate pressure so the initial flow of pressure fluid bends or tilts the ring 28 so the face F is inclined to meet the approaching portions of the cylinder wall as the piston 18 moves.

It should be noted that fluid pressure is thus resolved in an outwardly direction and is limited to a small part of the ring's width. Because of this, friction is lessened and the result is longer sealing life. As the circumference of the ring 28 wears, the fluid penetrates deeper into the groove 36 as shown in FIG. 4 and eventually enters under the thin lip but cannot extend beyond since pressure seals the lip on the far or exhaust side of the groove.

It should also be noted that the tilted face F causes the ring to glide over the lubricant instead of scraping it clean from the cylinder wall. The resulting improvement in lubrication reduces friction between the ring 28 and wall of the cylinder 10.

By employing a reversed ring 30 having the rectangular portion of the body inside and the tapered portion outside of the annulus, an effective rod seal as shown in FIG. 1 is obtained because the same outward action as described above is present, now inwardly.

A double set of rings 30 can be used for rod packing as shown in FIG. 5. Pressure fluid, as shown by the feathered arrows, similarly enters to deflect the innermost ring 30 in its tapered groove 36 (similar to groove 28) against the direction of travel of the piston rod for a lubricant-smoothing seal at this point. The outer ring 30, however, is deflected by the rod movement in its direction of travel and so acts to shear or scrape in this case to free the rod 20 of dirt from the exterior. In the push stroke or opposite movement of the rod 20, both rings 30 incline in the direction of travel.

In another embodiment of the invention as shown best in FIG. 6, the ring 50 would have the flat face F but the entire body would taper therefrom to a point on the inner periphery. The groove 52 in the piston 18 in this case would have uniformly tapered walls all the way to its bottom but at a greater angle from vertical than the walls of the ring 50 so as to form a space 54 for the pressure fluid to enter and bend the ring as it seats in the groove and incline face F in the direction of piston travel.

Obviously many modifications and variations of the present invention are possible in light of the above teachings. It is, therefore, to be understood that within the scope of the appended claims the invention may be practiced otherwise than as specifically described.

What is claimed is:

1. A seal for the space between the surfaces of two relatively annular slidable members, the surface of one of said members having an annular groove extending substantially transversely to the direction of relative slide of said members, said groove having inwardly slanted sides terminating in a bottom seat portion having spaced convex shaped sides and a flat bottom face, an annular resilient member having a body portion of substantially rectangular cross section with parallel spaced sides and a flat peripheral contacting top face and a bottom portion with a flat bottom face positioned parallel to said contacting top face and of narrower width than said contacting top face, said bottom portion having spaced concave shaped sides joining said flat bottom face with said parallel spaced sides of said body portion, with said concave shaped sides and bottom face of said bottom portion being formed to mate with said convex shaped sides and flat bottom face of said groove, with the distance between said slanted sides of said annular groove becoming gradually greater than the distance between said parallel sides of said body portion of said annular resilient ring, said annular resilient member being positioned substantially within said groove and retained thereby and having its bottom portion restrained against lateral movement by the bottom seat portion of said annular groove, said flat peripheral contacting top face of said annular resilient member being in full engagement with the surface of the other of said annular slidable members to seal the space between the surfaces of the said two annular slidable members, and with the sides of said annular resilient member being substantially free of contact with the inwardly slanted sides of said groove, said body portion of said annular resilient member flexing laterally to incline said flat peripheral contacting top face with respect to the surface of said other member upon sliding of one of said members relative to the other member, whereby one edge of said flat peripheral contacting top face contacts said surface of said other member and the opposite side of said annular resilient member contacts the corresponding side of said groove.

2. In combination, a pair of annular members spaced one from the other and arranged to slide one along the other, the surface of one of said members having an annular groove extending substantially transversely to the direction of relative slide of said members, said groove having inwardly slanted sides terminating in a bottom seat portion having spaced convex shaped sides and a flat bottom face, and an annular resilient member having a body portion of substantially rectangular cross section, with parallel spaced sides and a flat peripheral contacting top face and a bottom portion with a flat bottom face positioned parallel to said contacting top face and of narrower width than said contacting top face, said bottom portion having spaced concave shaped sides joining said flat bottom face with said parallel spaced sides of said body portion, with said concave shaped sides and bottom face of said bottom portion being formed to mate with said convex shaped sides and flat bottom face of said groove, with the distance between said slanted sides of said annular groove becoming gradually greater than the distance between said parallel sides of said body portion of said annular resilient ring, said annular resilient member being positioned substantially within said groove and retained thereby and having its bottom portion restrained against lateral movement by the bottom seat portion of said annular groove, said flat peripheral contacting top face of said annular resilient member being in full engagement with the surface of the other of said annular slidable members to seal the space between the surfaces of the said two annular slidable members, and with the sides of said annular resilient member being substantially free of contact with the inwardly slanted sides of said groove, said body portion of said annular resilient member flexing laterally to incline said flat peripheral contacting top face with respect to the surface of said other member upon sliding of one of said members along relative to the other member, whereby one edge of said flat peripheral contacting top face contacts said surface of said other member and the opposite side of said annular resilient member contacts the corresponding side of said groove.

3. In the combination as recited in claim 2, wherein each side of said inwardly slanted sides of said annular groove diverges outwardly from its respective side of said parallel sides of said annular resilient member at an angle of less than 10°.

References Cited

UNITED STATES PATENTS

| 2,360,731 | 10/1944 | Smith | 277—177 |
| 2,368,744 | 2/1945 | Carey | 277—188 |
| 2,474,132 | 6/1949 | Vernet | 277—170 |
| 2,960,198 | 11/1960 | Keefe | 277—173 XR |

FOREIGN PATENTS

| 944,761 | 6/1956 | Germany. |
| 726,809 | 3/1955 | Great Britain. |

SAMUEL ROTHBERG, *Primary Examiner.*